(No Model.)
W. HUFMAN.
LOCOMOTIVE HEAD LIGHT.
No. 358,038. Patented Feb. 22, 1887.
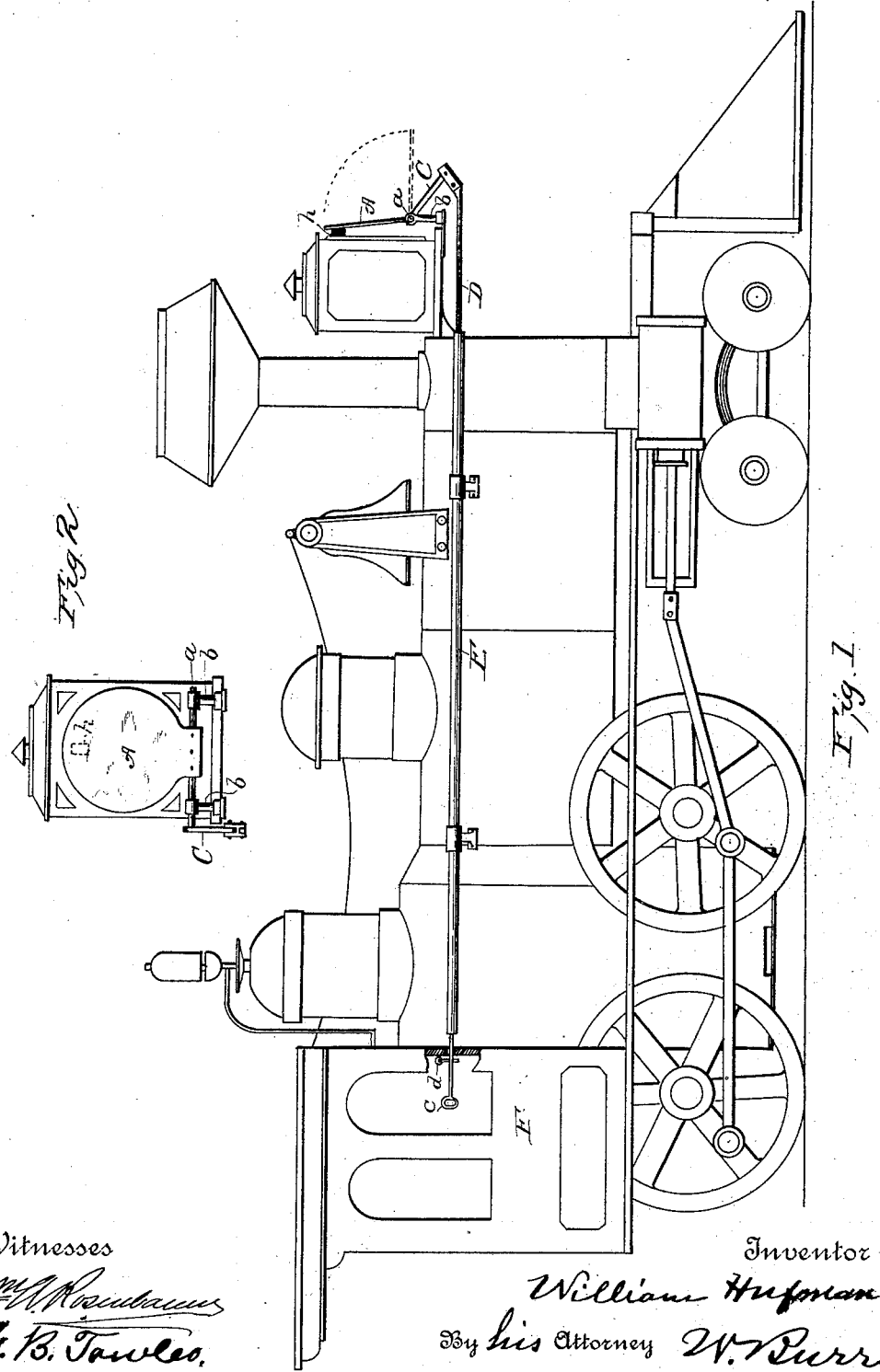
Witnesses
Wm. A. Rosenbaum
G. B. Towles.
Inventor
William Hufman
By his Attorney W. Burris

UNITED STATES PATENT OFFICE.

WILLIAM HUFMAN, OF CLINTON, IOWA.

LOCOMOTIVE HEAD-LIGHT.

SPECIFICATION forming part of Letters Patent No. 358,038, dated February 22, 1887.

Application filed June 1, 1886. Serial No. 203,813. (No model.)

*To all whom it may concern:*

Be it known that I, WILLIAM HUFMAN, a citizen of the United States of America, residing at Clinton, in the county of Clinton and State of Iowa, have invented certain new and useful Improvements in Head-Light-Shade Attachments, of which the following is a specification, reference being had therein to the accompanying drawings.

The object of my invention is the construction of improved devices whereby the locomotive-engineer may, without leaving his cab, open and close the adjustable shade; and the invention consists of the construction and combinations of such devices, as hereinafter fully set forth and claimed.

In the accompanying drawings, Figure 1 is a side elevation of a locomotive and engineer's cab, showing my improvement attached. Fig. 2 is a front elevation showing the shade closed.

A designates the shade, made of any suitable material, rigidly attached to a rock-bar, $a$, supported by and having its bearings on the standards $b$, attached in any suitable manner to the base of the head-light B.

C indicates a crank-arm attached to one end of the rock-bar.

D is a rod extended loosely through the pipe E, which forms the hand-rail of the running board of the locomotive. The forward end of this rod is pivoted to the crank-arm, and the rear end of the rod is extended into the engineer's cab F, and is provided with a suitable handle, $c$, for moving the rod, as required, in the adjustment of the shade. The portion of the rod D extending into the cab may be provided with notches or holes to receive a pin, $d$, or pawl constructed and arranged to hold the rod in place for the purpose of locking the shade in an open or closed position.

The shades heretofore used shut closely against the front of the head-light, causing the glass to become heated, so that when the shade is removed, especially in cold weather, the sudden cooling of the glass causes it to break. To avoid this I employ an elastic bearing, $h$, of rubber or other suitable material, attached at the top of the head-light frame or to the shade, in position to form a stop and bearing for the shade. This rubber bearing should be about one inch in thickness, allowing air-spaces all around the shade, thus preventing the overheating and sudden cooling of the head-light glass.

To close the shade the engineer pushes forward the rod D, which moves the crank-arm upward, rocking the bar $a$ and carrying the shade up in front of the head-light, causing it to impinge against the elastic bearing $h$. To remove the shade the rod D is drawn backward, causing the shade to drop in a horizontal position, as shown in Fig. 1 of the drawings.

What I claim as new, and desire to secure by Letters Patent, is—

1. The combination, with a locomotive head-light, of a rock-bar, $a$, an adjustable shade, A, attached to the rock-bar, the hollow hand-rail E, and the reciprocating rod D, extended through the hand-rail and connected with the rock-bar and with the engineer's cab, whereby the shade may be opened and closed over the head-light, substantially as and for the purposes described.

2. The combination, with the locomotive head-light B and the hollow hand-rail E, of the rock-bar $a$, the reciprocating rod D, extended through the hand-rail and connected with the rock-bar and the engineer's cab, the adjustable shade A, attached to the rock-bar, and the elastic bearing $h$, attached in position to hold the shade away from the head-light, substantially as and for the purposes described.

In testimony whereof I affix my signature in presence of two witnesses.

WM. HUFMAN.

Witnesses:
H. F. BOWERS,
FRANK W. MAHIN.